Figure 1:
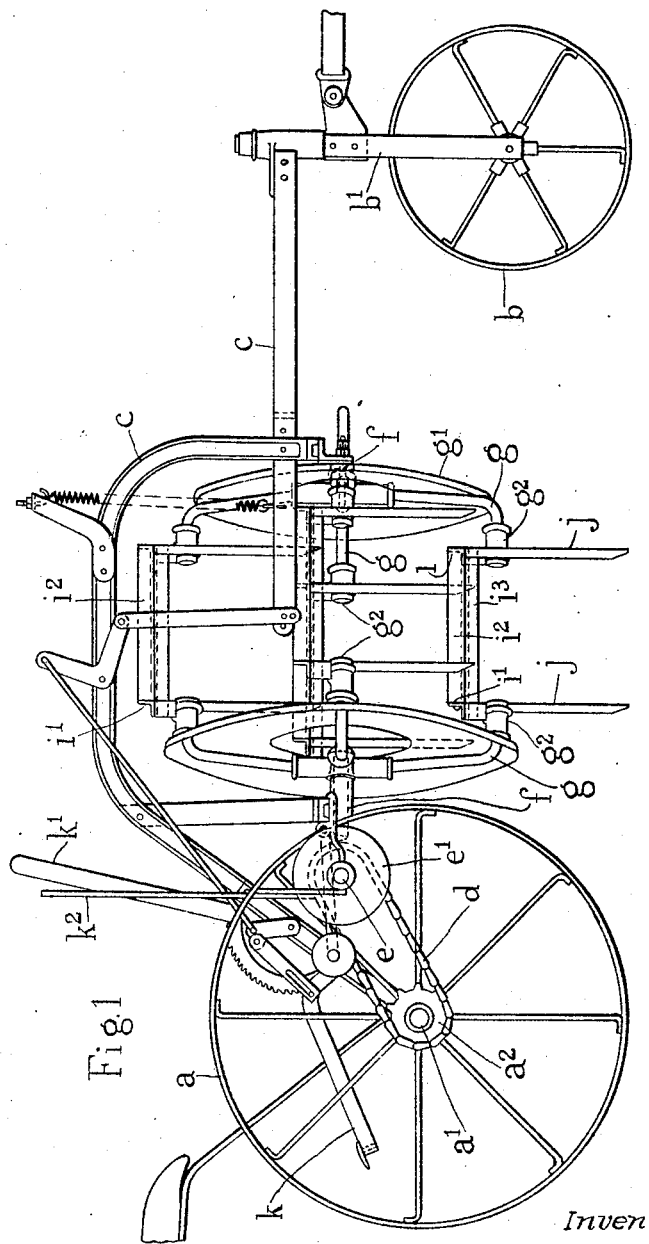

Sept. 30, 1924.

W. E. MARTIN

SWATH TURNER AND SIDE DELIVERY RAKE

Filed Dec. 29, 1922

1,509,840

2 Sheets-Sheet 1

Inventor:
William Edward Martin
by Knight Bro
Attorneys

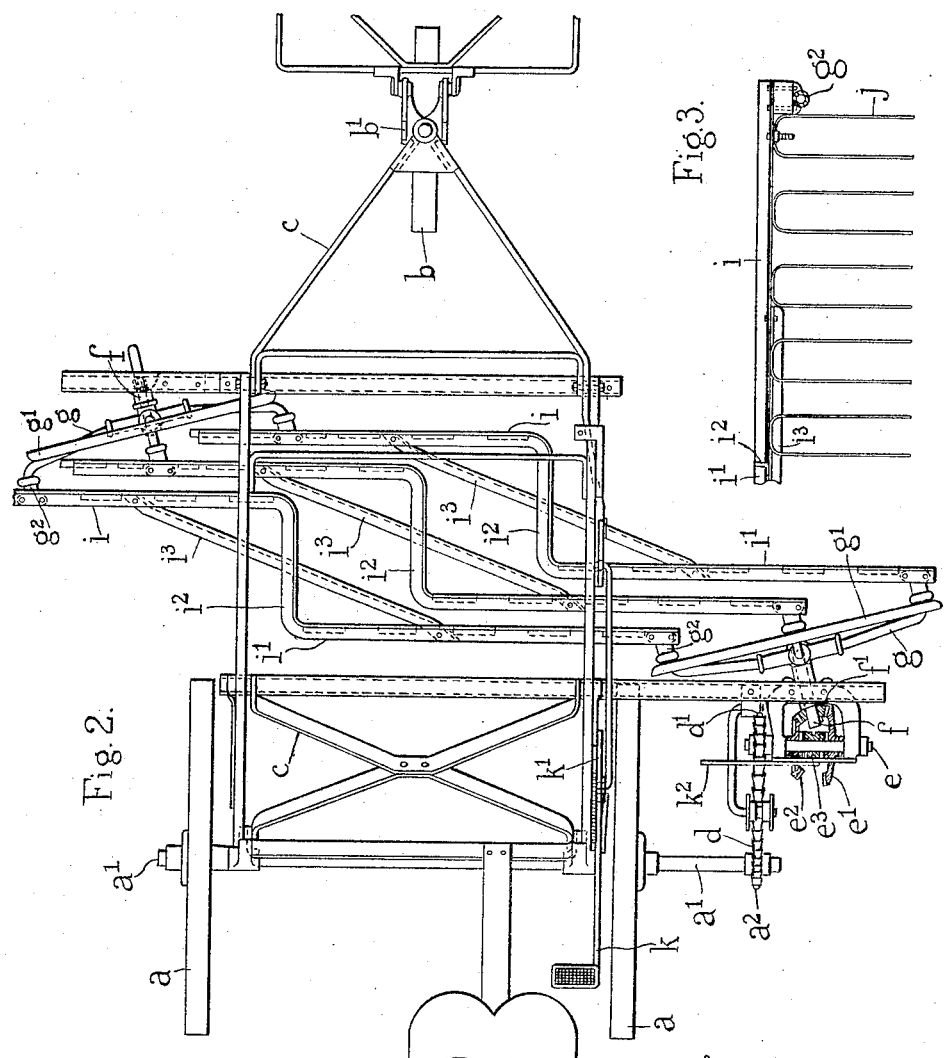

Patented Sept. 30, 1924.

1,509,840

UNITED STATES PATENT OFFICE.

WILLIAM EDWARD MARTIN, OF STAMFORD, ENGLAND.

SWATH TURNER AND SIDE-DELIVERY RAKE.

Application filed December 29, 1922. Serial No. 609,609.

*To all whom it may concern:*

Be it known that I, WILLIAM EDWARD MARTIN, a subject of the King of Great Britain, residing at "Rock House," Scotgate, Stamford, in the county of Lincoln, England, have invented a new and useful Improvement in Swath Turners and Side-Delivery Rakes, of which the following is a specification.

The invention relates to that type of implement having revolving rakes, the teeth of which are always in a hanging position, which rakes when driven in one direction turn over two swaths and leave them as separate swaths but which when driven in the opposite direction act as a side delivery rake.

In carrying the present invention into effect the implement is provided with two parallel shafts preferably set at a slight angle to the line of travel of the machine, each carrying a flyer having radial arms or the like and each flyer is pivoted at its outer edge near to one end of a rake head. Hitherto such rake heads have passed in a straight line in plan from one flyer to the other flyer.

According to the present invention, the rake heads are doubly bent each having two parallel ends arranged transversely of the machine in a horizontal plane set at a small angle to the plane of the flyers and preferably at right angles to the travel of the machine and these parallel parts are connected by a part which is generally approximately at right angles to the parallel ends. The rake teeth are carried only by the two parallel ends of the rake head and the intermediate connecting part is sufficiently long to allow the first swath to be turned out of the way of the second swath before this latter is turned onto the land or part of the land previously occupied by the first swath. When the flyers are reversed the first swath is raked onto the second swath and both swaths are then raked by the rear rakes into a windrow.

The implement is provided with reversing gearing, as is usual in this type of implement, which preferably drives the rakes faster when used for swath turning than when used for forming a windrow.

The invention is illustrated in the accompanying drawings in which Figure 1 is a side elevation of the improved swath turner and Figure 2 is a plan of the same. Figure 3 is a front elevation of part of one of the rakes.

$a\ a$ are the driving wheels mounted on the shaft $a^1$ and $b$ is the front carrying wheel mounted in a fork $b^1$. $c$ is the main frame of the implement. The shaft $a^1$ is provided at one end with a chain wheel $a^2$, which by means of a chain $d$ drives the chain wheel $d^1$ fixed on the end of a counter shaft $e$. This latter has loosely mounted thereon two bevel wheels $e^1\ e^2$ of different diameters, the larger one $e^1$ being used for driving the rakes when the machine is used as a swath turner and the smaller one $e^2$ being used to drive the rakes when the machine is used as a side delivery rake. Between the bevel wheels $e^1\ e^2$ is located a clutch $e^3$ by means of which either of the bevel wheels $e^1\ e^2$ may be connected to the counter shaft $e$, which is constantly driven when the machine is running.

The machine is provided with suitable bearings for carrying two parallel shafts $f\ f$, one of which is provided with a single bevel wheel $f^1$, which is always in gear with the bevel wheels $e^1\ e^2$ and is driven by either of them. Each parallel shaft is provided with a flyer which, as illustrated, has radial arms $g$ and each set of radial arms is provided with a shield $g^1$, as is common in the art. The ends of the radial arms $g$ are mounted in bearings $g^2$ at or near the ends of the rakes.

Each rake head consists of two parallel parts $i\ i^1$, which are located transversely of the machine in a horizontal plane, the one part $i$ being set sufficiently in advance of the other part $i^1$ to enable it to rake the crop away from the ground onto which the crop will be delivered by the other part $i^1$ in the act of swath turning. These two parallel parts $i\ i^1$ are connected by an intermediate part $i^2$, which is approximately at right angles to the parts $i\ i^1$. Each rake head is preferably formed by doubly bending a single piece of angle iron to produce the two parallel parts and the intermediate connecting part. The rake heads are preferably stiffened by a suitable stay $i^3$. The two parallel parts $i\ i^1$ are each provided with suitable tines $j$.

The implement is provided with the usual foot lever $k$ for quickly raising the raking mechanism when at work if it encounters any obstruction. The hand lever $k^1$ is for adjusting the height of the raking mechanism and for raising the same when the implement is not in use. $k^2$ is a lever for operating the clutch $e^3$.

What I claim as my invention is:—

1. A swath turner and side delivery rake comprising two parallel shafts, a flyer mounted on each parallel shaft, means for driving one of the parallel shafts in opposite directions, doubly bent rake heads carried by and connecting the flyers, each rake head having two parts arranged transversely of the machine in a horizontal plane and laterally displaced and longitudinally parallel with respect to each other and an intermediate connecting part, and hanging teeth carried by the parallel parts of the rake head, substantially as set forth.

2. A swath turner and side delivery rake comprising two parallel shafts, a flyer mounted on each parallel shaft, means for driving one of the parallel shafts in opposite directions, doubly bent rake heads carried by and connecting the flyers, each rake head having two parts arranged transversely of the machine in a horizontal plane and laterally displaced and longitudinally parallel with respect to each other and an intermediate connecting part, hanging teeth carried by the parallel parts and a stay the ends of which are connected to the parallel parts of the rake head, substantially as set forth.

3. A swath turner and side delivery rake comprising two parallel shafts set at a slight angle to the line of travel of the machine, a flyer mounted on each parallel shaft, means for driving the parallel shafts in opposite directions, doubly bent rake heads carried by and connecting the flyers, each rake head having two parallel parts in a horizontal plane set at right angles to the line of travel of the machine, and laterally displaced with respect to each other, an intermediate part connecting the parallel parts of the rake head and hanging teeth carried by the parallel parts of the rake head, substantially as set forth.

4. A swath turner and side delivery rake comprising two parallel shafts set at a slight angle to the line of travel of the machine, a flyer mounted on each parallel shaft, means for driving the parallel shafts in opposite directions, doubly bent rake heads carried by and connecting the flyers, each rake head having two parallel parts in a horizontal plane set at right angles to the line of travel of the machine, and laterally displaced with respect to each other, an intermediate part set at right angles to and connecting the parallel parts of the rake head and hanging teeth carried by the parallel parts of the rake head, and a stay the ends of which are connected to the parallel parts of the rake head, substantially as set forth.

5. A swath turner and side delivery rake having shaft driving means, a shaft, two bevel wheels of different diameters loosely mounted on said shaft, a clutch located between the bevel wheels for connecting either bevel wheel to its shaft, a single bevel wheel which is always in gear with the said bevel wheels, two parallel shafts on one of which the said single bevel wheel is mounted, a flyer carried by each of the parallel shafts, doubly bent rake heads carried by and connecting the flyers, each rake head having two parts arranged transversely of the machine in a horizontal plane which are laterally displaced and longitudinally parallel with respect to each other, and intermediate part connecting the adjacent ends of the parallel parts and hanging teeth carried by the parallel parts of the rake head, substantially as set forth.

6. A swath turner and side delivery rake comprising two parallel shafts, a flyer having radial arms and a shield mounted on each parallel shaft, means for driving one of the parallel shafts in opposite directions, doubly bent rake heads carried by and connecting the flyers, each rake head having two parts arranged transversely of the machine in a horizontal plane which are laterally displaced and longitudinally parallel with respect to each other and an intermediate connecting part, and hanging teeth carried by the parallel parts of the rake head, substantially as set forth.

7. A swath turner and side delivery rake having shaft driving means, a shaft, two bevel wheels of different diameters loosely mounted on said shaft, a clutch located between the bevel wheels for connecting either bevel wheel to its shaft, a single bevel wheel which is always in gear with the said bevel wheels, two parallel shafts on one of which the said single bevel wheel is mounted, a flyer carried by each of the parallel shafts, doubly bent rake heads carried by and connecting the flyers, each rake head having two parts arranged transversely of the machine in a horizontal plane, which are laterally displaced and longitudinally parallel with respect to each other, and intermediate part connecting the adjacent ends of the parallel parts, hanging teeth carried by the parallel parts of the rake head and a stay, the ends of which are connected to the parallel parts of the rake head, substantially as set forth.

8. A swath turner and side delivery rake comprising two parallel shafts, a flyer having radial arms and a shield mounted on each parallel shaft, means for driving one of the parallel shafts in opposite directions, doubly bent rake heads carried by and connecting the flyers, each rake head having two parts arranged transversely of the machine in a horizontal plane which are laterally displaced and longitudinally parallel with respect to each other and an intermediate connecting part, hanging teeth carried by the parallel parts of the rake head, and a stay the ends of which are connected to the parallel parts of the rake head, substantially as set forth.

In witness whereof I have hereunto set my hand in presence of two witnesses.

WILLIAM EDWARD MARTIN.

Witnesses:
 CLAUDE K. MILLS,
 HAROLD S. MILLS.